(12) United States Patent
Park

(10) Patent No.: US 6,774,068 B2
(45) Date of Patent: Aug. 10, 2004

(54) THERMOPLASTIC FELT STRUCTURE FOR AUTOMOBILE INTERIOR SUBSTRATE

(75) Inventor: Sung-Ho Park, Asan (KR)

(73) Assignee: Han Il E Hwa Co., LTD, Seoul (KR)

(*) Notice: Subject to any disclaimer, the term of this patent is extended or adjusted under 35 U.S.C. 154(b) by 82 days.

(21) Appl. No.: 09/997,831

(22) Filed: Nov. 29, 2001

(65) Prior Publication Data
US 2002/0102896 A1 Aug. 1, 2002

(30) Foreign Application Priority Data
Nov. 30, 2000 (KR) .......................................... 2000-71817

(51) Int. Cl.⁷ .............................. B32B 5/02; B32B 5/26; B32B 9/02
(52) U.S. Cl. ....................... 442/326; 442/320; 442/321; 442/324; 442/402; 428/219; 428/317.9; 428/318.4
(58) Field of Search ................................. 442/320, 321, 442/324, 326, 402; 428/219, 317.9, 318.4

(56) References Cited

U.S. PATENT DOCUMENTS

| | | | |
|---|---|---|---|
| 5,037,690 A | * | 8/1991 | van der Kooy ............. 428/118 |
| 5,614,285 A | | 3/1997 | Gardill |
| 5,709,925 A | * | 1/1998 | Spengler et al. ............ 428/198 |
| 6,127,021 A | | 10/2000 | Kelman |
| 6,280,816 B1 | | 8/2001 | McCooey |
| 6,524,691 B2 | * | 2/2003 | Sugawara et al. ....... 426/292.4 |

FOREIGN PATENT DOCUMENTS

| | | | | | |
|---|---|---|---|---|---|
| DE | 2034089 A | * | 1/1972 | ........... A47L/23/22 |
| FR | 2287333 A | * | 6/1976 | ............. B32B/5/12 |

* cited by examiner

Primary Examiner—Elizabeth M. Cole
Assistant Examiner—Norca L. Torres
(74) Attorney, Agent, or Firm—J.C. Patents

(57) ABSTRACT

Disclosed is a thermoplastic felt structure for an automobile interior substrate, comprising a pair of mat units, each mat unit having a felt layer which is made by a mixture of a jute fiber and a PP fiber mixed in the weight ratio of about 5 to 5~6 to 4 and a PP foaming fiber adhered to one side of the felt layer, said mat units being coupled each other on the other sides of the felt layers. With this configuration, a thermoplastic felt structure for an automobile interior substrate can prevent a deflection thereof, and have high strength and stiffness, heat-resistance and impact-resistance. Further, the present thermoplastic felt structure can decrease the cost of raw material, enhance the fuel efficiency with a lightweight body, and accomplish a simple manufacturing process.

5 Claims, 4 Drawing Sheets

THERMOPLASTIC FELT STRUCTURE FOR AUTOMOBILE INTERIOR SUBSTRATE

BACKGROUND OF THE INVENTION

1. Field of the Invention

The present invention relates in general to automobile interiors, and more particularly, to a substrate for automobile interiors made of thermoplastic felt structure, which is lightweight, high-rigid, and impact-resistant.

2. Description of the Related Art

An automobile interior includes a main panel for a door trim, a rear shelf, a head liner, an instrument panel, a pillar, etc., and component such as an air bag, a switch, a speaker, a lamp, air conditioning components, decoration components, etc. combined to the main panel. The main panel is comprised of a substrate and a skin layer attached to the substrate, and fixed to the inside of the automobile by means of a retainer, a screw, etc.

The substrate must have sufficient stiffness and rigidity so as to keep a shape and to combine various components thereto, must not have sharp edges even if it is broken, and must have high impact-resistance.

In addition, it is desirable that the substrate is lightweight for enhancing the fuel efficiency, does not emit an odor, is recyclable, and has the low cost of materials and a simple manufacturing process in order to increase the productivity thereof.

As one example of a conventional automobile interior substrate, there is proposed a substrate which is molded by heat-pressing a resinated felt and a wood fiber. A main panel is formed by applying adhesives to the substrate, drying the substrate for a predetermined period of time, and adhering a skin layer to the substrate by vacuum forming. To the resinated felt and the wood fiber is needed to be added a hardening agent, namely, hexamine in order to promote a thermosetting property of a phenolic resin. The hexamine produces outgrowths like amine and ammonia at decomposition reaction. These outgrowths cause an offensive odor, and are noxious to a human body. Furthermore, the powdered phenolic resin produces fallout at a handling process thereof. Further, an offensive odor is given-off according as an organic solvent is volatilized in the process of applying the solvent type adhesives for adhering the skin layer to the substrate, thereby making working surroundings poor.

As another examples of conventional automobile interior substrates, there are proposed Korean patent application Nos. 98-013416, titled "Method of making automobile interiors", and 98-013417, titled "Automobile interiors". The automobile interiors have, as shown in FIG. 1, a substrate made of three layers. An intermediate layer 3 thereof is of a mat shape, and made by mixing a PP (Polypropylene) fiber with a flax fiber in the ratio of 5 to 5, and the other layers 1 are a sheet which is made by mixing a PP fiber with a polyester fiber in the ratio of 7 to 3. However, the above conventional automobile interior substrate has the following shortcomings.

First, in the process of manufacturing the mat 3, if weight per area of the mat is 1400 g/m$^2$ or more, conveyor's speed should be reduced according as a web is thicker in a web forming process. Then a needle-punching stroke should be prolonged and power for driving a needle-punching machine should be increased, so that the whole manufacturing processing becomes unbalanced and the equipments are overloaded. Further, a needle is likely to be broken, and the broken needle is likely to be embedded in the mat. Besides, the production speed is dropped.

Second, because the needle punching is performed in one direction, the mat has an asymmetric internal stress in a vertical direction. Thus, when the mat is preheated for making the automobile interior, the mat is deformed toward needle-punched surface, thereby causing such problems that the quality thereof deteriorates, the stiffness thereof is lowered in comparison with other automobile interiors having the same weight, and a heat-resistant property becomes inferior.

Third, because relatively various components such as PP fiber, flax fiber, and polyester fiber are employed in the automobile interior substrate, the recycling efficiency is also lowered.

SUMMARY OF THE INVENTION

Accordingly, the present invention has been made keeping in mind the above-described shortcomings and user's need, and an object of the present invention is to provide a thermoplastic felt structure for an automobile interior substrate, which can prevent deformation thereof, with high rigidity and high impact-resistance.

Another object of the present invention is to provide a thermoplastic felt structure for an automobile interior substrate, which can enhance the fuel efficiency thereof with light weight and decrease the cost of material.

Still another object of the present invention is to provide a thermoplastic felt structure for an automobile interior substrate, which can decrease the cost of production with a simple manufacturing process.

This and other objects of the present invention may be accomplished by the provision of a thermoplastic felt structure for an automobile interior substrate, comprising a pair of mat units, each mat unit having a felt layer which is made by a mixture of a jute fiber and a PP fiber mixed in the weight ratio of about 5 to 5~6 to 4 and a PP foaming fiber adhered to one side of the felt layer, said mat units being coupled each other on the other sides of the felt layers.

Preferably, the jute fiber has about 40~120 μm diameter and about 45~80 mm length. Herein, the jute fiber shows its excellence in stiffness and durability in comparison with another hemp fibers. That's the reason why a jute fiber is employed.

Preferably, the PP fiber has about 6~15 denier diameter and about 45~80 mm length. At this time, if the diameter thereof is below the 6 demier, the cutting step is not easy, and if the diameter thereof is beyond the 15 denier, a uniform mixing is difficult.

Preferably, the PP fiber is comprised of a staple fiber having a crimp in order to improve the needle-punching efficiency.

Effectively, a weight per area of the PP foaming resin is about 50~100 g/m$^2$.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE PREFERRED EMBODIMENT

Preferred embodiments of the present invention will be described in more detail with reference to the accompanying drawings.

Figure 1:
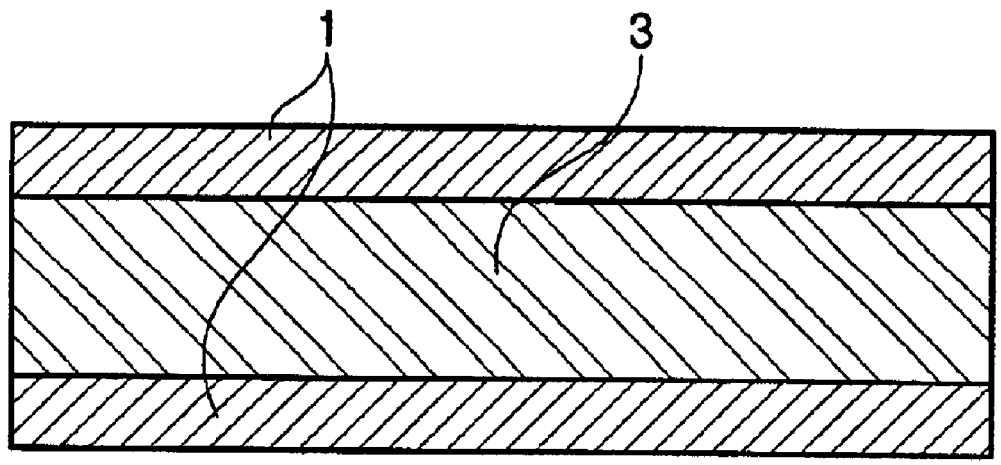
FIG. 1 is a sectional view showing a conventional thermoplastic felt structure for an automobile interior substrate.
Figure 2:
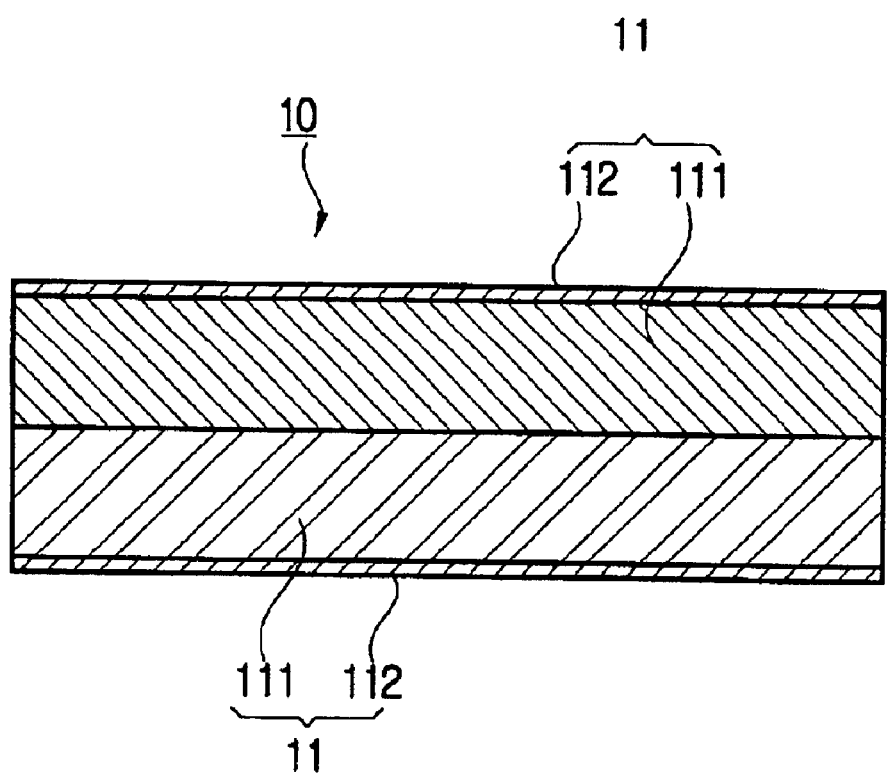
FIG. 2 is a sectional view showing a thermoplastic felt structure for an automobile interior substrate according to the present invention.

As shown in FIG. 2, a thermoplastic felt structure 10 according to the present invention is made of four layers, two felt layers 111 and two PP (Polypropylene) foaming resin layers 112. That is, the structure 10 is comprised of two mat units 11 which are symmetrically coupled each other, each mat unit 11 having one felt layer 111 and one foaming resin layer 112.

The felt layer 111 is made by mixing a jute fiber with a PP fiber in the weight ratio of 5 to 5~6 to 4. In the mixture of the jute fiber and the PP fiber for the felt layer 111, the jute fiber functions to increase strength, stiffness and impact-resistance of the felt layer 111, and the PP fiber functions to bind the jute fibers each other and to give plasticity for forming the automobile interior substrate. Herein, according as the percentage of the jute fiber increases, the stiffness and rigidity thereof is increased but the plasticity thereof is decreased. Thus, the felt layer 111 according to the present invention can accomplish the balance between the strength and stiffness and the plasticity by adjusting the mixing ratio of the jute fiber to the PP fiber in the range of 5 to 5~6 to 4.

The foaming resin layer 112 is made from homo-polymer PP, and has weight per area of 50~100 g/m$^2$. The foaming resin layer 112 is melted and absorbed into the surface of the felt layer 111 when the thermoplastic felt structure 10 is preheated for the automobile interior substrate, thereby allowing the automobile interior substrate to have a fine surface. Thus, the surface of the automobile interior substrate is strengthened and the stiffness of the automobile interior increases by 15% or more. Further, adhesive strength of the substrate is improved when attachments such as a retainer, a fastener, etc. are adhered to the automobile interior substrate by melting.

Further, the symmetrical structure of the thermoplastic felt structure 10 prevents deformation under a plate forming for the automobile interior substrate.

Figure 3:
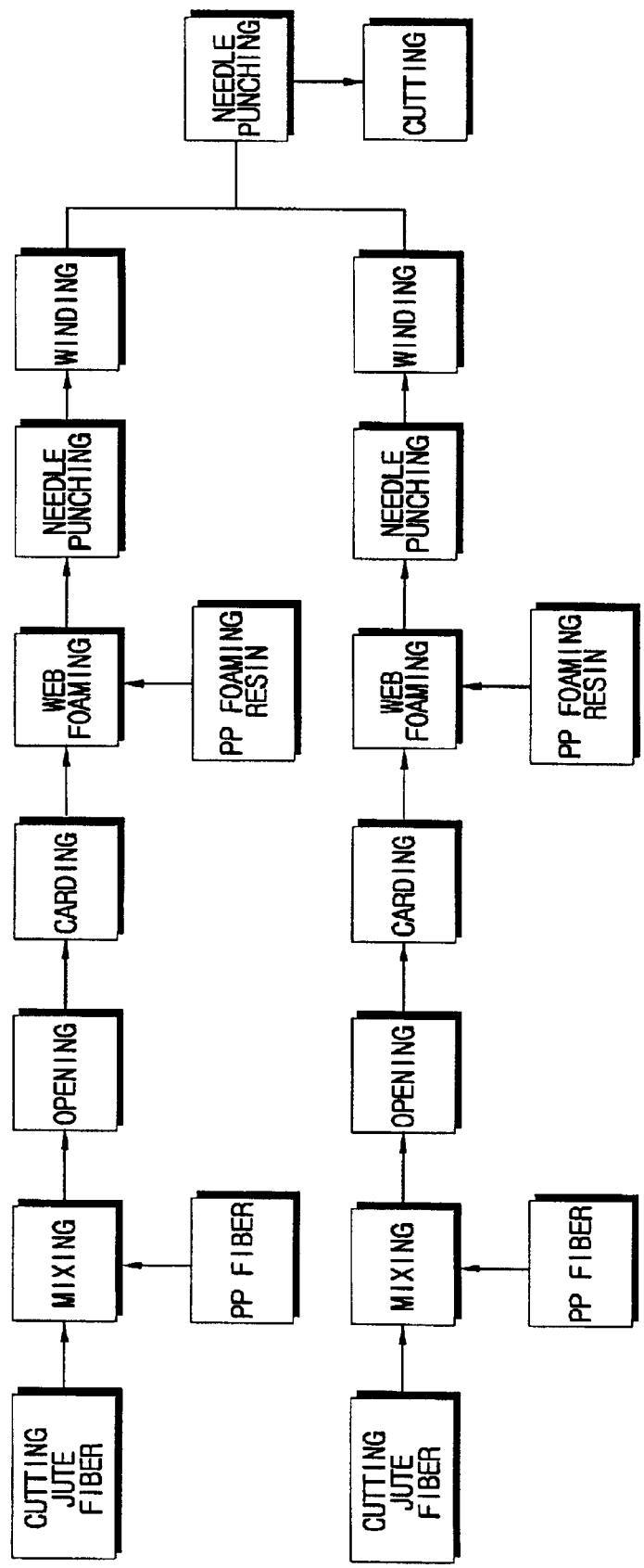
FIG. 3 is a block diagram showing a manufacturing process of the thermoplastic felt structure according to the present invention.

As shown in FIG. 3, the manufacturing process of the thermoplastic felt structure 10 according to the present invention is performed as follows.

Firstly, in a cutting step, the jute fiber of about 40~120 μm diameter is cut into pieces of about 45~80 mm length. Generally, a hemp fiber is classified into hemp, jute and linen, and the jute among them shows its excellence in strength, stiffness and durability, thereby being employed as a material for making a rope, a jute bag, etc. Thus, the jute is preferably employed in the thermoplastic felt structure according to the present invention. The PP fiber of about 6~15 denier diameter is cut into pieces of about 45~80 mm length. If the diameter of the PP fiber is below about 6 denier, the carding efficiency is lowered, whereas if the diameter of the PP fiber is beyond about 15 denier, it is difficult to uniformly mix the PP fiber with the jute fiber. Further, it is desirable that the PP fiber is a staple fiber having a crimp, which improves the needle-punching efficiency.

Secondly, in a mixing step, the jute fiber is mixed with the PP fiber in the weight ratio of 5 to 5~6 to 4. Thirdly, in an opening step, the jute and PP fibers are unraveled, fluffed by means of a spike roll, and then re-mixed. Fourthly, in a carding step, the jute and PP fibers are scraped and lined up with a wire fillet by strands, and then unraveled and re-mixed. Fifthly, in a web foaming step, a web supplied from the carding step is piled up in many folds on the PP foaming resin which is set on a conveyor belt until the weight per area and width of the web reach predetermined values. At this time, the weight per area of the PP foaming resin is about 50~100 g/m$^2$.

Sixthly, in a first needle punching step, the piled web and the foaming resin are physically bound and formed into a map having a desired thickness by a needle punching. Seventhly, in a winding step, the mat through the needle punching is wound into a roll type. Then, in a second needle punching step, the role-type mats through the seventh winding step, is needle-punched again, making the respective felt layers in contact. Lastly, in a trimming step, the felt layer through the second needle punching step is trimmed and cut at a desirable length and a desirable width, thereby completing the thermoplastic felt structure 10 for the automobile interior substrate.

Figure 4:
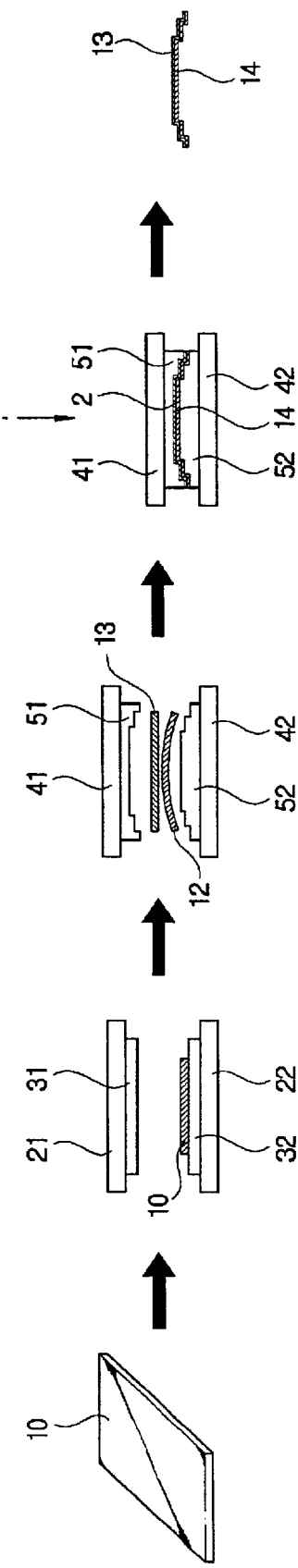
FIG. 4 shows a forming process of the automobile interior substrate, using the thermoplastic felt structure according to the present invention.

As shown in FIG. 4, a forming process of the automobile interior substrate using the thermoplastic felt structure 10 according to the present invention will be described hereinbelow.

Firstly, the thermoplastic felt structure 10 manufactured by the above-described process is heat-pressed by means of plate dies 31 and 33 combined to hot presses 21 and 22 at 180~230° C. At this time, the heat-pressing condition is established such that time until temperature of the middle of the thermoplastic felt structure 10 reaches 170~190° C. is 40~90 sec. Further, a gap between the plate dies 31 and 33 is established at about 1.2~1.8 times of the thickness of a finished automobile interior substrate, and pressure is established as 1~5 kgf/cm$^2$. Thereafter, the heat-pressed thermoplastic felt structure 12 is press-formed by means of the cooling dies 51 and 52 combined to presses 41 and 42. Herein, in the cooling dies 51 and 52 is circulated cooling water, and therefore the heat-pressed thermoplastic felt structure 12 is pressed at 10~30 kgf/cm$^2$ and cooled into 30~60° C. for 40~60 sec., thereby completing an automobile interior substrate 14. When the heat-pressed thermoplastic felt structure 12 is pressed, a skin layer 13 may be pressed together, as necessary.

EXAMPLE 1

This example shows an application to an automobile interior door trim. Herein, a PP fiber was used, which is a PP resin homo-polymer, has 6 denier diameter and 65 mm length, and is a staple fiber having a crimp for improving the needle-punching efficiency. Further, a jute fiber was used, which has average 80 μm diameter and is cut into pieces of 60 mm length. The weight ratio of the jute fiber to the PP fiber was 55 to 45. A weight per area of a PP foaming resin was 60 g/m$^2$, and the weights per area of felts manufactured through the above-described manufacturing process were 1800, 1900 and 2000 g/m$^2$. The process of forming an automobile interior substrate was performed as follows: a hot press was operated at 200~210° C. while the distance between plate dies was adjusted at 3.5 mm. At this time, pressure was 2 kgf/cm$^2$, and the thermoplastic felt was heated until temperature of the middle thereof reached 180° C. for 45 sec. Further, the distance between cooling dies was adjusted at 2.25 and 2.5 mm, the pressure was 12 kgf/cm$^2$, and cooling duration was 45 sec., thereby completing the automobile interior substrate. Hereinbelow, the testing result of physical properties of the automobile interior substrate will be shown in Table 1, in comparison with samples of the conventional automobile interior substrate.

TABLE 1

| Test item | Unit | Testing method | Examples according to the present invention | | | | Comparative samples | | |
|---|---|---|---|---|---|---|---|---|---|
| | | | #1 | #2 | #3 | #4 | Resinated felt | Flax fiber | Fiber board |
| Thickness | mm | | 2.5 | 2.5 | 2.25 | 2.5 | 2.5 | 2.5 | 2.5 |
| Weight | g/m$^2$ | | 1,800 | 2,000 | 1,800 | 1,900 | 2,000 | 1,800 | 2,000 |
| Density | g/cm$^2$ | KSM3014 | 0.72 | 0.80 | 0.82 | 0.76 | 0.8 | 0.72 | 0.80 |
| Tensile strength | | | | | | | | | |
| Longitudinal | kgf/cm$^2$ | KSM3006 | 125.3 | 143.8 | 170.1 | 128.7 | 111.5 | 130.6 | 135.3 |
| Transverse | | | 268.5 | 385.2 | 557.4 | 345.0 | 135.6 | 211.4 | 237.8 |
| Bending Strength | | | | | | | | | |
| Longitudinal | kgf/cm$^2$ | KSM3008 | 218.5 | 305.8 | 254.3 | 255.6 | 186.4 | 251.6 | 229.1 |
| Transverse | | | 460.1 | 502.1 | 399.6 | 419.1 | 175.3 | 315.4 | 334.5 |
| Bending modulus of elasticity | | | | | | | | | |
| Longitudinal | kgf/cm$^2$ | KSM3008 | 15,280 | 20,740 | 18,850 | 17,600 | 16,540 | 15,180 | 16,880 |
| Transverse | | | 37,810 | 42,490 | 45,960 | 32,240 | 14,370 | 18,050 | 30,570 |
| Bursting strength | kgf/cm$^2$ | KSM7082 | 36 | 41 | 37 | 38 | 33 | 31 | 37 |
| Heat deflection ratio | % | | 4.63 | 2.70 | 3.85 | 4.02 | 1.04 | 12.67 | 4.13 |
| Air permeability | cc/cm$^2$/sec | | 0.72 | 0.46 | 0.41 | 0.58 | 2.12 | 0.31 | 0.49 |

Where #1, #2, #3 are, as a four-layered structure according to the present invention, different in weight and thickness, and #4 shows the case that the PP foaming resin is removed from the four-layered structure according to the present invention.

EXAMPLE 2

This example shows an application to an interior decoration rear shelf. Herein, a PP fiber, a jute fiber, a PP foaming resin were used under the same condition as in the first example. Further, a felt was manufactured by the same method as in the first example but the weights per area thereof were 2400, 2700 and 3000g/m$^2$. In the forming process of an automobile interior substrate, a hot press was operated at 200~210° C. and the distance between plate dies was adjusted at 4.0 mm. At this time, pressure was 2 kgf/cm$^2$, and the thermoplastic felt was heated until temperature of the middle thereof reached 180° C. for 45 sec. Further, the distance between cooling dies was adjusted at 2.75 and 3.1 mm, the pressure was 15 kgf/cm, and cooling duration was 50 sec., thereby completing the automobile interior substrate. Hereinbelow, the testing result of physical properties of the automobile interior substrate will be shown in Table 2, in comparison with samples of the conventional automobile interior substrate.

TABLE 2

| Test item | Unit | Testing method | Examples according to the present invention | | | Comparative samples | |
|---|---|---|---|---|---|---|---|
| | | | #1 | #2 | #3 | Wood sheet 1 | Wood Sheet 2 |
| Thickness | mm | | 2.75 | 2.75 | 3.1 | 2.5 | 3 |
| Weight | g/m$^2$ | | 2.400 | 2.600 | 3.000 | 2.750 | 3.300 |
| Density | g/cm$^2$ | KSM3014 | 0.87 | 0.95 | 0.97 | 1.10 | 1.10 |
| Tensile strength | | | | | | | |
| Longitudinal | kgf/cm$^2$ | KSM3006 | 190.5 | 207.4 | 216.2 | 213.8 | 269.8 |
| Transverse | | | 527.1 | 489.0 | 586.9 | 165.7 | 197.0 |
| Bending strength | | | | | | | |
| Longitudinal | kgf/cm$^2$ | KSM3008 | 350.1 | 359.2 | 437.5 | 391.7 | 468.4 |
| Transverse | | | 637.8 | 721.7 | 786.7 | 318.4 | 365.3 |
| Bending modulus of elasticity | | | | | | | |
| Longitudinal | kgf/cm$^2$ | KSM3008 | 20.860 | 22.030 | 20.253 | 33.990 | 34.650 |
| Transverse | | | 37.970 | 38.500 | 39.230 | 25.870 | 26.270 |
| Bursting strength | kgf/cm$^2$ | KSM7082 | 45 or more | 41 | 38 | 26 | 35 |
| Heat deflection ratio | % | | 2.31 | 2.10 | 2.07 | 6.08 | 5.32 |

Where #1, #2, #3 are, as a four-layered structure according to the present invention, different in weight and thickness.

With this configuration, thermoplastic felt structure for an automobile interior substrate can prevent a deflection thereof, and have high strength and stiffness, heat-resistance and impact-resistance. Further, the present thermoplastic felt structure can decrease the cost of raw material, enhance the fuel efficiency with a lightweight body, and accomplish a simple manufacturing process.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A thermoplastic felt structure for an automobile interior substrate, comprising a pair of mat units, each mat unit having a felt layer which is made by a mixture of a jute fiber and a polypropylene fiber mixed in the weight ratio from about 5 parts by weight jute fiber to 5 parts by weight polypropylene fiber to about 6 parts by weight jute fiber to 4 parts by weight polypropylene fiber, and a polypropylene foaming resin adhered to one side of the felt layer, said mat units being coupled to each other on the other sides of the felt layers.

2. The thermoplastic felt structure according to claim 1, wherein the jute fiber has about 40~120 $\mu$m diameter and about 45~80 mm length.

3. The thermoplastic felt structure according to claim 1, wherein the polypropylene fiber has about 6~15 denier diameter and about 45~80 mm length.

4. The thermoplastic felt structure according to claim 1, wherein the polypropylene fiber is comprised of a staple fiber having a crimp in order to improve the needle-punching efficiency.

5. The thermoplastic felt structure according to claim 1, wherein a weight per area of the polypropylene foaming resin is about 50~100 g/m$^2$.

* * * * *